United States Patent
Ishikawa

(10) Patent No.: US 11,878,867 B2
(45) Date of Patent: Jan. 23, 2024

(54) LIFTING AND LOWERING TRANSPORTATION DEVICE

(71) Applicant: MURATA MACHINERY, LTD., Kyoto (JP)

(72) Inventor: Kazuhiro Ishikawa, Inuyama (JP)

(73) Assignee: MURATA MACHINERY, LTD., Kyoto (JP)

( * ) Notice: Subject to any disclaimer, the term of this patent is extended or adjusted under 35 U.S.C. 154(b) by 0 days.

(21) Appl. No.: 17/765,994

(22) PCT Filed: Sep. 2, 2020

(86) PCT No.: PCT/JP2020/033169
§ 371 (c)(1),
(2) Date: Apr. 1, 2022

(87) PCT Pub. No.: WO2021/065302
PCT Pub. Date: Apr. 8, 2021

(65) Prior Publication Data
US 2022/0348411 A1    Nov. 3, 2022

(30) Foreign Application Priority Data
Oct. 2, 2019    (JP) .................................. 2019-182361

(51) Int. Cl.
*B65G 17/18*      (2006.01)
*B65G 17/40*      (2006.01)
(Continued)

(52) U.S. Cl.
CPC ............. *B65G 17/18* (2013.01); *B65G 17/40* (2013.01); *B65G 23/36* (2013.01); *B65G 54/02* (2013.01)

(58) Field of Classification Search
CPC ........ B65G 17/18; B65G 17/40; B65G 23/36; B65G 17/123; B65G 17/345;
(Continued)

(56) References Cited

U.S. PATENT DOCUMENTS 4,004,654 A * 1/1977 Hamy ..................... B66B 9/003
  187/250
4,465,177 A * 8/1984 Dorner .................. B65G 47/57
  198/799
(Continued)

FOREIGN PATENT DOCUMENTS

CN    106628849 A    5/2017
JP    64-32825 U     3/1989
(Continued)

OTHER PUBLICATIONS

Official Communication issued in International Patent Application No. PCT/JP2020/033169, dated Nov. 10, 2020.

*Primary Examiner* — Mark A Deuble
(74) *Attorney, Agent, or Firm* — Keating & Bennett, LLP

(57) ABSTRACT

A lifting and lowering transportation device is capable of transporting articles between different delivery positions using transportation units, each including a lifting and lowering platform, a linear motor, and a chain. The lifting and lowering platform can pass through the delivery positions by moving along the circumferential track that is common to the transportation units. The linear motor generates the driving force to move the lifting and lowering platform along the circumferential track. The chain is loop-shaped and can circulate along the circulation track corresponding to the circumference path, and the linear motor moves the lifting and lowering platform by circulating the chain by the driving force generated by the linear motor. The (Continued)

circulation of the chain in each transportation unit is controlled independently of the other transportation units.

13 Claims, 5 Drawing Sheets

(51) Int. Cl.
*B65G 23/36* (2006.01)
*B65G 54/02* (2006.01)

(58) Field of Classification Search
CPC ...... B65G 47/643; B65G 47/57; B65G 17/34; B65G 23/23; B65G 54/02
USPC ............ 198/619, 794–801, 370.06
See application file for complete search history.

(56) References Cited

U.S. PATENT DOCUMENTS

| | | | | |
|---|---|---|---|---|
| 4,987,992 A * | 1/1991 | Pfleger | ................ | B65G 17/18 D34/28 |
| 5,050,726 A * | 9/1991 | Flagg | ................ | B65G 17/123 198/799 |
| 5,101,963 A * | 4/1992 | Skarlupka | ............ | B65G 17/123 198/838 |
| 5,788,057 A * | 8/1998 | Walser | ............... | B65G 47/5122 211/121 |
| 6,321,899 B1 * | 11/2001 | Hannessen | ........... | B65G 17/123 198/475.1 |
| 6,378,689 B1 * | 4/2002 | Wellpott | ................ | B65G 47/57 198/377.01 |
| 8,770,385 B2 * | 7/2014 | Hannessen | ............. | B65G 47/57 198/607 |

FOREIGN PATENT DOCUMENTS

| | | |
|---|---|---|
| JP | 04-112103 A | 4/1992 |
| JP | 08-059139 A | 3/1996 |
| JP | 2005-298126 A | 10/2005 |
| JP | 2015-145312 A | 8/2015 |

* cited by examiner

LIFTING AND LOWERING TRANSPORTATION DEVICE

BACKGROUND OF THE INVENTION

1. Field of the Invention

The present invention relates to a lifting and lowering transportation device.

2. Description of the Related Art

Conventional lifting and lowering transportation devices that lift and lower articles between a plurality of delivery positions are known. Japanese Utility Model Application Publication No. S64-32825 discloses a vertical transportation facility that is a lifting and lowering transportation device of this type.

The vertical transportation facility of Japanese Utility Model Application Publication No. S64-32825 has a plurality of load receiving platforms on an endless rotating body that moves up and down in a vertical transportation duct. The vertical transportation facility is also provided with a linear motor formed by a primary conductor arranged on the load receiving platform side and a secondary conductor arranged on the duct side of the load loading/unloading section. The linear motor constitutes a transfer device that transfers the load between the load receiving platform and the load (article) loading/unloading section.

SUMMARY OF THE INVENTION

In the configuration of Japanese Utility Model Application Publication No. S64-32825, for a plurality of load receiving platforms, the circumferential distance of the load receiving platforms adjacent to each other in the circumferential direction of an endless rotating body are the same as those of other load receiving platforms. In other words, the plurality of load receiving platforms are arranged at an equal pitch in relation to the endless rotating body. Therefore, it is necessary to load the article to the load receiving platform while conforming to the pitch. Therefore, while an article is being loaded into one load receiving platform, the other articles may not be able to be loaded into other load receiving platforms, which may cause a decrease in the efficiency of transporting articles.

Preferred embodiments of the present invention each prevent a decrease in the efficiency of transporting articles.

According to an aspect of a preferred embodiment of the present invention, a lifting and lowering transportation device is capable of transporting articles between a plurality of delivery positions. The lifting and lowering transportation device includes a plurality of transportation units and a controller. The controller is configured or programmed to control the transportation units. Each of the transportation units includes a lifting and lowering platform, a driver, and a circulator. The lifting and lowering platform can pass through the plurality of the delivery positions by moving along a circumferential track including a vertical track extending in a vertical direction. The circumferential track is common to a plurality of the transportation units. The driver generates a driving force to move the lifting and lowering platform along the circumferential track. The circulator is loop-shaped and can circulate along a circulation track corresponding to the circumferential track. The circulator circulates by the driving force generated by the driver to move the lifting and lowering platform. The controller is configured or programmed to control the circulation of the circulators in each of the transportation units independently with respect to the other transportation unit.

This allows the lifting and lowering platform of each transportation unit to be moved along the circumferential track independently with respect to the lifting and lowering platform of other transportation units. Therefore, articles can be transported while increasing or decreasing the distance between adjacent lifting and lowering platforms in the movement direction as appropriate to the extent that mechanical interference does not occur. Therefore, the transportation efficiency of articles can be effectively improved.

In a lifting and lowering transportation device according to a preferred embodiment of the present invention, it is preferable that the lifting and lowering platform included in each of the transportation units includes a rotor and a transporter. The rotor can rotate around an axis in a vertical direction. The transporter is driven by the rotation of the rotor to transport the article for delivery. Lifting and lowering platform stators are provided corresponding to the plurality of delivery positions. The lifting and lowering platform stator preferably has a hollow shape. An inner space of the lifting and lowering platform stator is open to outside at both ends of a vertical direction of the lifting and lowering platform stator. The lifting and lowering platform stator includes an opening that opens the inner space to the outside in a horizontal direction. The opening connects open portions at both ends in the vertical direction. When the lifting and lowering platform is at any of the plurality of delivery positions, the lifting and lowering platform stator at the delivery position is positioned so that the lifting and lowering platform stator is not in contact with and surrounds the rotor in the lifting and lowering platform. The lifting and lowering platform stator drives the rotor in a non-contact manner by generating a magnetic effect while surrounding the rotor.

As a result, in relation to the motor which includes the rotor and the lifting and lowering platform stator, the transport device can be driven by supplying electric power to the lifting and lowering platform stator without installing electric wires in the lifting and lowering platform or the like which is movable.

In a lifting and lowering transportation device according to a preferred embodiment of the present invention, the driver can include a linear motor including a mover connected to the circulator and a circulation drive stator provided on the fixed side.

In this case, by supplying electric power to the circulation drive stator on the fixed side without installing electric wires to the circulator, etc. which is movable, the linear motor can generate a driving force to the mover to move the lifting and lowering platform.

In a lifting and lowering transportation device according to a preferred embodiment of the present invention, it is preferable that the circulation drive stator is common to the plurality of transportation units.

This allows the number of parts to be reduced.

In a lifting and lowering transportation device according to a preferred embodiment of the present invention, it is preferable that the mover and the lifting and lowering platform are positioned with respect to the circulator at positions that divide the circulator in a loop shape into two portions of equal length.

This allows the mover to function as a counterweight to the lifting and lowering platform, no matter where the lifting and lowering platform is positioned in the circumferential track. Therefore, the weight of a separate counterweight can be reduced or the counterweight can be omitted.

A lifting and lowering transportation device according to a preferred embodiment of the present invention can have the following configuration. That is, the driver includes a rotary motor. The circulator is driven by the rotation of the drive rotor by the rotational force generated by the rotary motor.

This allows the circulation driver to be driven with a simple configuration.

In a lifting and lowering transportation device according to a preferred embodiment of the present invention, it is preferable to have the following configuration. That is, the circulator includes a chain. The rotary motor is an electric motor. The drive rotor is a sprocket that meshes with the chain.

This allows for a simplified configuration.

In a lifting and lowering transportation device according to a preferred embodiment of the present invention, it is preferable that two of the lifting and lowering platforms are attached to the circulator. The two lifting and lowering platforms are positioned with respect to the circulator at positions that divide the circulator in a loop shape into two portions of equal length.

This allows one of the lifting and lowering platforms to function as a counterweight to the other, no matter where the lifting and lowering platforms are positioned in the circumferential track.

In a lifting and lowering transportation device according to a preferred embodiment of the present invention, it is preferable that the mover includes a U-shaped cross section. The circulation drive stator can pass relatively through the inner space surrounded by the mover.

This allows a powerful linear motor to be realized.

In a lifting and lowering transportation device according to a preferred embodiment of the present invention, it is preferable that the circulation drive stators are provided along the circumferential track. In a traveling direction of the mover, a distance between adjacent circulation drive stators is shorter than a length of the mover.

As a result, it is possible to keep a state in which any of the circulation drive stators can apply magnetism to the mover, no matter what position the mover is at. Therefore, a stable drive by a linear motor can be realized.

In a lifting and lowering transportation device according to a preferred embodiment of the present invention, it is preferable that the lifting and lowering platform is supported by the circulator in a cantilevered manner.

This makes it possible to configure the transportation unit in a simple manner.

A lifting and lowering transportation device according to a preferred embodiment of the present invention can be used to transport articles between different floors in a building having a plurality of floors.

In this case, the efficiency of inter-floor transport can be improved.

A lifting and lowering transportation device according to a preferred embodiment of the present invention can be used for transport articles between different tiers in a rack including a plurality of tiers.

In this case, the articles can be transported efficiently between different tiers.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
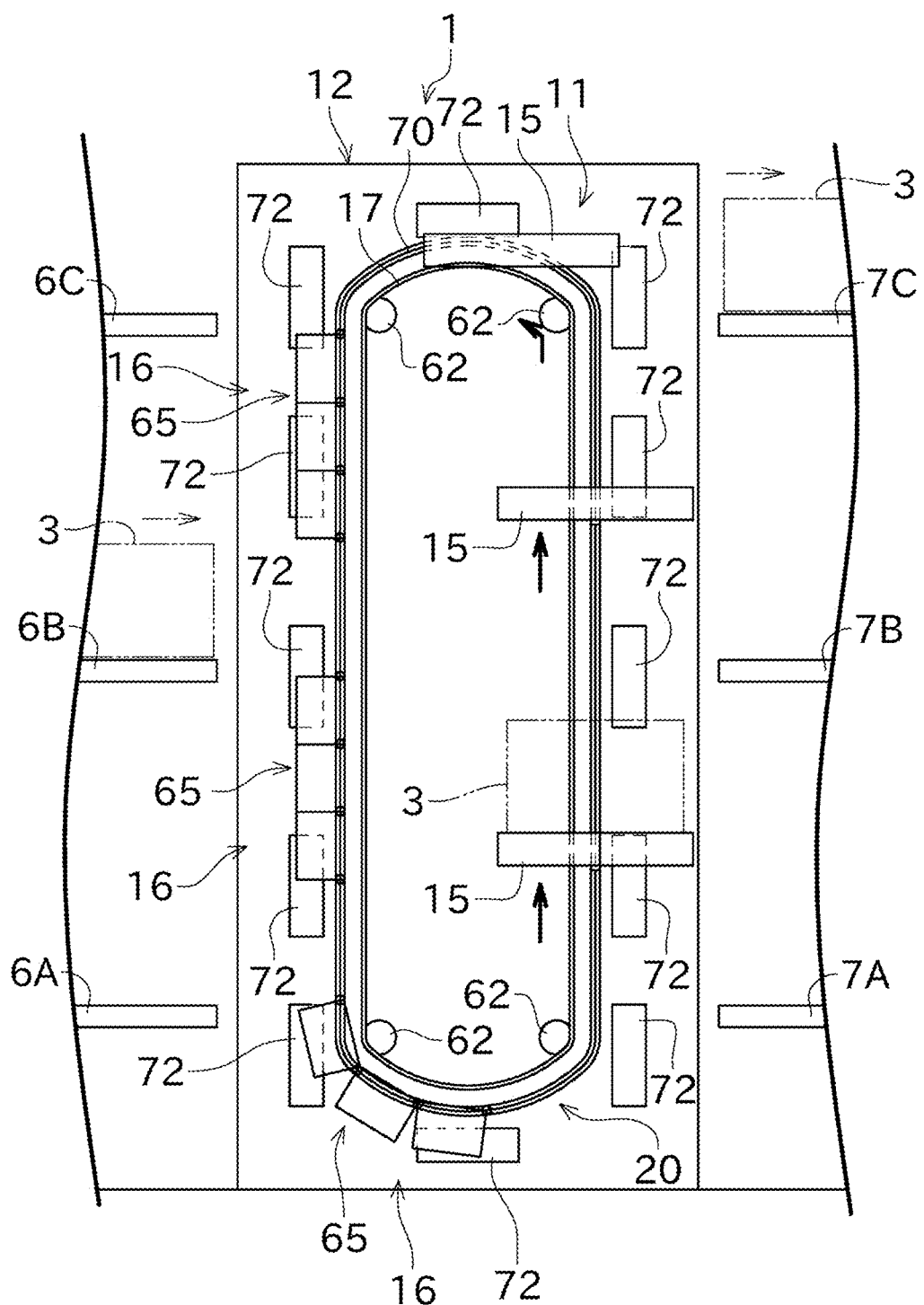
FIG. 1 is a schematic view of a lifting and lowering transportation device according to a preferred embodiment of the present invention.
Figure 2:
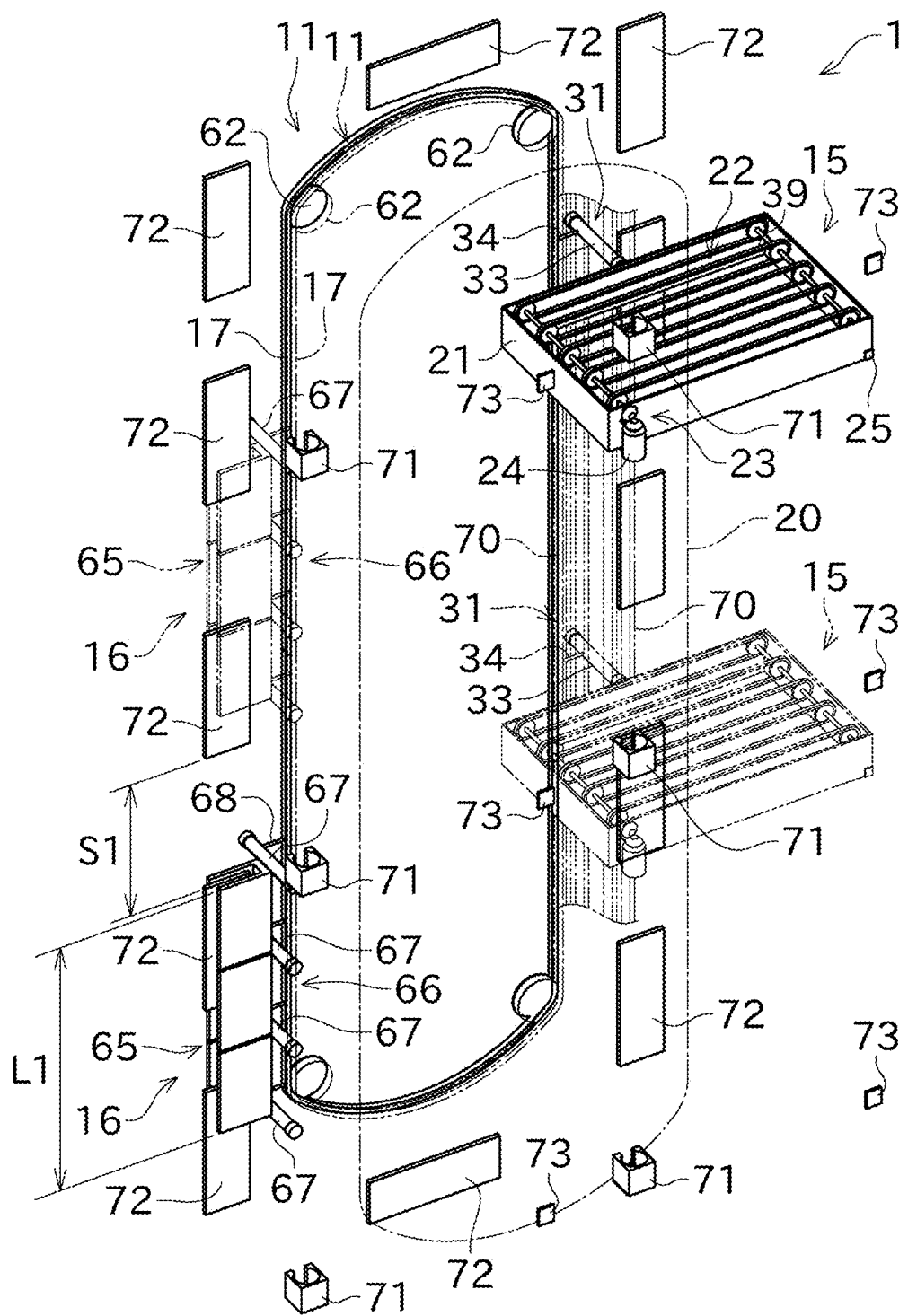
FIG. 2 is a perspective view showing the positional relationship of a plurality of transportation units.
Figure 3:
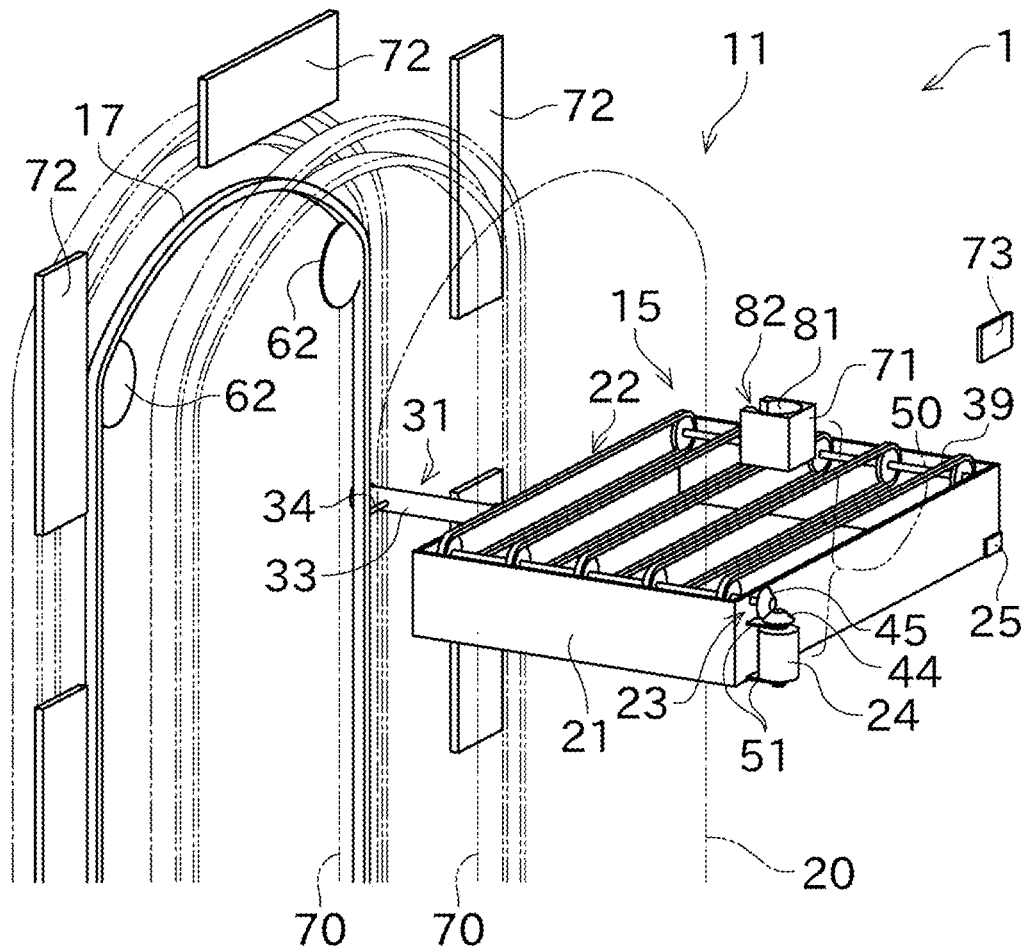
FIG. 3 is an enlarged perspective view showing a lifting and lowering platform in detail.

Next, with reference to the drawings, lifting and lowering transportation devices according to preferred embodiments of the present invention will be described. FIG. 1 is a schematic view of a lifting and lowering transportation device 1 according to a preferred embodiment of the present invention. FIG. 2 is a perspective view showing the positional relationship of a plurality of transportation units 11. FIG. 3 is an enlarged perspective view showing a lifting and lowering platform 15 in detail.

The lifting and lowering transportation device 1 of this preferred embodiment is used as an inter-floor transport device to transport articles between different floors in a factory (building) having a plurality of floors. In this preferred embodiment, the factory has three floors, from the first floor to the third floor.

As shown in FIG. 1, first transport sections 6A to 6C and second transport sections 7A to 7C are arranged in the factory so that articles 3 can be transported between each floor of the factory. The first transport section 6A and the second transport section 7A are located on the first floor. The first transport section 6B and the second transport section 7B are located on the second floor. The first transport section 6C and the second transport section 7C are located on the third floor. The first transport sections 6A to 6C are located on one side of the horizontal direction of the lifting and lowering transportation device 1, and can load the articles 3 into the lifting and lowering transportation device 1. The second transport sections 7A to 7C are located on the opposite side of the first transport sections 6A to 6C across the lifting and lowering transportation device 1 and can unload the articles 3 out of the lifting and lowering transportation device 1. The first transport sections 6A to 6C and the second transport sections 7A to 7C can be configured as belt conveyors, for example, but are not limited thereto.

In the lifting and lowering transportation device 1, a plurality of delivery positions are each defined. The delivery position is a position where at least any of loading and unloading of the article 3 is performed. In the present preferred embodiment, each of the delivery positions is classified as either a loading position or an unloading position. The loading positions are the three positions where the lifting and lowering transportation device 1 and each of the first transport sections 6A to 6C are connected. The unloading positions are the three positions where the lifting and lowering transportation device 1 and each of the second transport sections 7A to 7C are connected.

The number and location of the delivery positions can be changed arbitrarily according to the number of floors in the factory and the layout of the transport sections. For example, the device may be configured so that both loading and unloading can be performed at a single delivery position.

As shown in FIG. 1, the lifting and lowering transportation device 1 is provided with a plurality of transportation units 11 and a frame (fixed side member) 12. In this preferred embodiment, six transportation units 11 are provided. However, in FIG. 1, only three of the six transportation units 11 are drawn and the others are omitted for the sake of clarity in the configuration of the lifting and lowering transportation device 1. In FIG. 2, one of the six transportation units 11 is drawn with a solid line, and another one of the transportation units 11 is drawn with a double-dotted line, and the others are omitted. In FIG. 3, only the configuration corresponding to one transportation unit 11 is shown.

Each of the transportation units 11 is located across multiple floors between the first transport sections 6A to 6C and the second transport sections 7A to 7C. The plurality of transportation units 11 each receive articles 3 from any of the first transport sections 6A to 6C and transport the articles 3 to any of the second transport sections 7A to 7C. Which floor is the source and destination of the transportation are arbitrary.

Each transportation unit 11 is equipped with a lifting and lowering platform 15, a linear motor (drive unit) 16, and a chain (circulation member) 17.

In the present preferred embodiment, one lifting and lowering platform 15 is provided for each transportation unit 11. The lifting and lowering platform 15 can move in a circulation manner along a circumferential track 20 arranged to connect the plurality of delivery positions. This circumferential track 20 includes a vertical track extending vertically across multiple floors. The delivery position is located at any midway through or end of this vertical track.

The circumferential track 20 is common to all six transportation units 11. Therefore, the six lifting and lowering platforms 15 move along the same circumferential track 20. Each of the six lifting and lowering platforms 15 passes through the six delivery positions sequentially by moving along the circumferential track 20.

The number of lifting and lowering platforms 15 (in other words, the number of transportation units 11) is arbitrary, as long as it is plural. The number of lifting and lowering platforms 15 preferably is equal to the number of delivery positions in this preferred embodiment, but it can be more or less than the number of delivery positions.

The linear motor 16 generates a driving force to move the lifting and lowering platform 15 along the circumferential track 20. The linear motor 16 is controlled by a controller 100 shown in FIG. 4. Details of the controller 100 will be described later.

The chain 17 is loop-shaped and configured to be circulatable so as to travel along a circulation track corresponding to the circumferential track 20. The circulation track is shaped to offset the circumferential track 20 by a certain distance to the inner circumference. The circulation track is symmetrical about an imaginary axis in the vertical direction. The lifting and lowering platform 15 is attached to the chain 17 at an appropriate position. A mover 65 is attached to the chain 17.

In this configuration, when the linear motor 16 generates a driving force, the chain 17 transmits the driving force to the lifting and lowering platform 15. Therefore, it can be said that the chain 17 is a transmission member that transmits the driving force of the linear motor 16 to the lifting and lowering platform 15. The chain 17 circulates in the circulation track by the driving force generated by the linear motor 16. As a result, the lifting and lowering platform 15 moves along the circumferential track 20.

Next, referring mainly to FIG. 2 and FIG. 3, the configuration of the transportation unit 11 will be described in detail.

As shown in FIG. 2, the plurality of transportation units 11 are located so that the chains 17 of the transportation units 11 are arranged in a row while being separated by a small distance between them. Although only two chains 17 are shown in FIG. 2, there are actually six chains 17 arranged in a row. The circulation track of each chain 17 has the same shape or substantially the same shape, and each chain 17 is parallel to the other chains 17. Therefore, when viewed along the direction in which the chains 17 are arranged, the circulation tracks of all the chains 17 are identical or substantially identical.

In each of the transportation units 11, sprockets 62 and guides (not shown) are arranged to guide the path of the chains 17 along the circulation track. The sprockets 62 and the like are supported by the frame 12 shown in FIG. 1. Each of the chains 17 can circulate independently of the other chains 17.

The above-described circumferential track 20, which corresponds the movement path of the lifting and lowering platform 15, is located on one side of the direction in which the plurality of chains 17 (in other words, the circulation tracks) are lined up in relation to the area in which the chains 17 are arranged. The lifting and lowering platform 15 of each transportation unit 11 are arranged on the respective chains 17 so as to divide the circumferential track 20 at appropriate intervals.

The lifting and lowering platform 15 has a lifting and lowering platform body 21, a transport device 22, a drive transmission mechanism 23, a rotor 24 and a portion to be detected 25.

The lifting and lowering platform body 21 can support the article 3 via the transport device 22. The lifting and lowering platform body 21 is connected to the chain 17 of the transportation unit 11 via a first connection portion 31.

Specifically, the first connection portion 31 includes a support traveling member 33 and a chain fixing member 34.

The support traveling member 33 is disposed outside the circulation track of the chain 17. The support traveling member 33 has an elongated bar shape so as to extend parallel to the axial direction of the sprocket 62 which guides the chain 17.

The chain fixing member 34 connects the support traveling member 33 and the chain 17 to each other. The chain fixing member 34 has an elongated bar shape.

The support traveling member 33 protrudes from the area where the plurality of chains 17 are lined up to one side in the direction in which the chains 17 are lined up. The lifting and lowering platform body 21 is rotatably supported on this protruding portion. Therefore, the lifting and lowering platform body 21 (in other words, the lifting and lowering platform 15) is supported by the chain 17 in a cantilevered state.

By supporting the lifting and lowering platform 15 in a cantilevered state, there is no need to place the chains 17 on both sides across the lifting and lowering platform 15. Therefore, the configuration can be simplified.

The traveling path of the support traveling member 33 is guided by a guide member 70. The guide member 70 has a guide groove in a shape corresponding to the circumferential track 20 described above. The guide member 70 can contact a plurality of portions of the support traveling member 33 to guide it. As the chain 17 is driven, the support traveling member 33 travels circumferentially along the aforementioned guide groove on the outer circumference side of the chain 17.

A posture maintaining mechanism that is not shown is provided between the support traveling member 33 and the lifting and lowering platform body 21. Although the orientation of the support traveling member 33 changes as it travels around the circumference, this posture maintaining mechanism can always make the lifting and lowering platform body 21 be oriented horizontally. Although the details will be omitted, any known configuration can be used as the posture maintaining mechanism.

As shown in FIG. 3, etc., the lifting and lowering platform body 21 includes the transport device 22, the drive transmission mechanism 23, the rotor 24, and a portion to be detected 25.

The transport device 22 transports the article 3 in a horizontal direction (a direction intersecting the lifting and lowering direction of the lifting and lowering platform 15) for delivery of the article 3. In the present preferred embodiment, the transport device 22 includes a plurality of chains 39 which are located in an arranged manner. Each of the chains 39 is wound between a drive sprocket and a driven sprocket. An input shaft is fixed to the drive sprocket, and this input shaft protrudes from the side of the lifting and lowering platform body 21. The transport device 22 is driven by a motor 50 described below.

The drive transmission mechanism 23 transmits the driving force of the motor 50, described below, to the transport device 22. The drive transmission mechanism 23 includes bevel gears 44, 45, which are disposed on a side portion of the lifting and lowering platform body 21. The bevel gear 44 is fixed to the output shaft of the motor 50. The bevel gear 45 is fixed to the input shaft of the drive sprocket of the chain 39 of the transport device 22. The two bevel gears 44, 45 mesh with each other. With the above, the rotation of the output shaft of the motor 50 can be transmitted to the chain of the transport device 22.

The rotor 24 is a cylindrical member and is disposed on a side portion of the lifting and lowering platform body 21. The rotor 24, together with a lifting and lowering platform stator 71, defines the motor 50. Each of lifting and lowering platform stators 71 is located corresponding to each of delivery positions. A pair of upper and lower support arms 51 are fixed to the lifting and lowering platform body 21. The rotor 24 is disposed between the pair of upper and lower support arms 51 and is supported at the ends of the support arms 51. The rotor 24 can rotate around an axis in the vertical direction. An output shaft is provided with the rotor 24, and the aforementioned bevel gear 44 is fixed to the output shaft.

A plurality of permanent magnets are arranged in the rotor 24 in such a way that the S-pole and N-pole are alternately aligned in the circumferential direction of the rotor 24. With the rotor 24 and the lifting and lowering platform stator 71 facing each other without contact, the lifting and lowering platform stator 71 acts magnetically to generate a rotational force on the rotor 24. The rotor 24 generates a rotational force. This rotational force is extracted from the output shaft as a driving force.

The lifting and lowering platform stator 71 can act magnetically on the rotor 24 of the lifting and lowering platform 15. One lifting and lowering platform stator 71 is arranged for each delivery position. Each lifting and lowering platform stator 71 is placed in correspondence with the trajectory through which the rotor 24 passes as the lifting and lowering platform 15 moves along the circumferential track 20. Since each lifting and lowering platform stator 71 is fixedly installed on the ground side (on the frame 12 side), the lifting and lowering platform stator 71 will not move even when the chain 17 is driven.

As shown in FIG. 3, each of the lifting and lowering platform stators 71 preferably has a C-shape in plan view. Specifically, an inner space 81 of the lifting and lowering platform stator 71 is open upward at the upper end of the lifting and lowering platform stator 71 and open downward at the lower end. In addition, the lifting and lowering platform stator 71 has an opening 82 that opens the inner space 81 to the outside in the horizontal direction, connecting the open portions at both ends in the vertical direction. This opening 82 is located at the lifting and lowering platform body 21.

When the lifting and lowering platform 15 is lifted or lowered, the rotor 24, the support arm 51, the bevel gears 44, 45, etc., provided on the lifting and lowering platform 15 can pass up or down through the inner space 81 or the opening 82 of the lifting and lowering platform stator 71.

The inner wall of the lifting and lowering platform stator 71 is provided so that it is not in contact with and surrounds the rotor 24 of the lifting and lowering platform 15 when the lifting and lowering platform 15 is at the corresponding delivery position. On this inner wall, a plurality of coils are arranged along the circumferential direction of the rotor 24. Accordingly, the rotor 24 can be rotatably driven without contact by applying an electric current to the coils in the lifting and lowering platform stator 71.

The portion to be detected 25 is configured as a permanent magnet in this preferred embodiment. As will be described in detail below, a position sensor 73 is provided at each delivery position. The position sensor 73 is configured as a magnetic sensor and is capable of detecting the portion to be detected 25.

Next, the linear motor 16 will be described in detail. The linear motor 16 includes a mover 65 and a circulation drive stator 72.

The mover 65 is disposed in the outer side of the chain 17. The mover 65 is connected to the chain 17 of the transportation unit 11 via a second connection portion 66.

The second connection portion 66 is similar in configuration to the first connection portion 31 and includes a support traveling member 67, and a chain fixing member 68.

The support traveling member 67 has an elongated bar shape so as to extend parallel to the axial direction of the sprocket 62 to guide the chain 17. The support traveling member 67 is driven by the chain 17 and travels circumferentially on the outer side of the chain 17 along the guide groove of the guide member 70.

The chain fixing member 68 connects the support traveling member 67 and the chain 17 to each other.

The tracks of the movers 65 are common to the six transportation units 11. Therefore, the six movers 65 travel along the same track.

Each of movers 65 includes a plurality (in this preferred embodiment, three, for example) of mover elements arranged in the longitudinal direction of the chain 17. A plurality of support traveling members 67 and a plurality of chain fixing members 68 are provided with the second connection portion 66. Each mover element is connected to the support traveling member 67 via a hinge mechanism so as to connect the support traveling members 67 located next to each other. Therefore, when the mover 65 travels along the curved portion of the path, the mover 65 can bend appropriately around the connected portion of the mover elements as shown in the lower part of FIG. 1.

The mover 65 (specifically, each mover element) is formed so that its cross-section, cut in a plane perpendicular to its traveling direction, is U-shaped as shown in FIG. 2. The mover 65 is arranged so that its opening faces the outer circumference of the chain 17. In the U-shaped mover 65, a plurality of permanent magnets are provided on both sides across the inner space thereof.

In the mover 65, the permanent magnets are arranged such that the S-pole and N-pole are alternately aligned in the traveling direction of the mover 65. With the mover 65 and the circulation drive stator 72 facing each other in a non-contact state, the circulation drive stator 72 acts magnetically on the mover 65 to generate a linear propulsion force. Accordingly, a linear propulsion force is generated in the mover 65. This propulsion force drives the chain 17 into circulation.

The circulation drive stator 72 is capable of acting magnetically on the mover 65. A plurality of circulation drive stators 72 are located in an arranged manner at appropriate intervals on the outer side of the chain 17. The circulation drive stator 72 is fixed to the frame 12 described above. Each of the circulation drive stators 72 is arranged in correspondence with the traveling path of the mover 65. Since each of the circulation drive stators 72 is fixedly installed, the circulation drive stator 72 does not move even when the chain 17 is driven.

The circulation drive stator 72 is common to the linear motors 16 of the plurality of transportation units 11. In other words, one set of circulation drive stator 72 is provided for each of the six transportation units 11.

Each of the circulation drive stators 72 is plate shaped. The circulation drive stator 72 can relatively pass through the inner space of the mover 65 formed in a U-shape when the mover 65 travels as the chain 17 travels.

In the circulation drive stator 72, a plurality of coils are lined up along the traveling direction of the mover 65. Accordingly, by applying current to the coils in the circulation drive stator 72, the mover 65 can be driven linearly without contact.

The coil disposed in the circulation drive stator 72 is configured without a core, although not shown. When the circulation drive stator 72 is inserted into the inner space of the mover 65, the permanent magnets of the mover 65 are located on both sides of the coreless type coil. By configuring the coreless type coil so that it is sandwiched between the permanent magnets from both sides, a strong driving force of the linear motor 16 can be realized while offsetting the adsorption force.

As mentioned above, the mover 65 is configured by connecting the mover elements in the traveling direction as appropriate, so that some length in the traveling direction is secured. Therefore, when focus is on any two circulation drive stators 72 adjacent to each other in the traveling direction of the mover 65, the distance S1 is shorter than the length L1 in the traveling direction of the mover 65 (S1<L1). Therefore, when the mover 65 is at any position in the traveling path, any of the plurality of circulation drive stators 72 can face the mover 65 and act magnetically on it.

When focusing on the respective transportation unit 11, the mover 65 and the lifting and lowering platform 15 are positioned at positions that divide the chain 17 in a loop shape into two portions of equal length. In other words, the lifting and lowering platform 15 is displaced by half a revolution with respect to the mover 65 in the circumferential direction of the chain 17. As a result, no matter where the mover 65 and the lifting and lowering platform 15 are, the mover 65 can function as a kind of counterweight in relation to the lifting and lowering platform 15.

Figure 4:
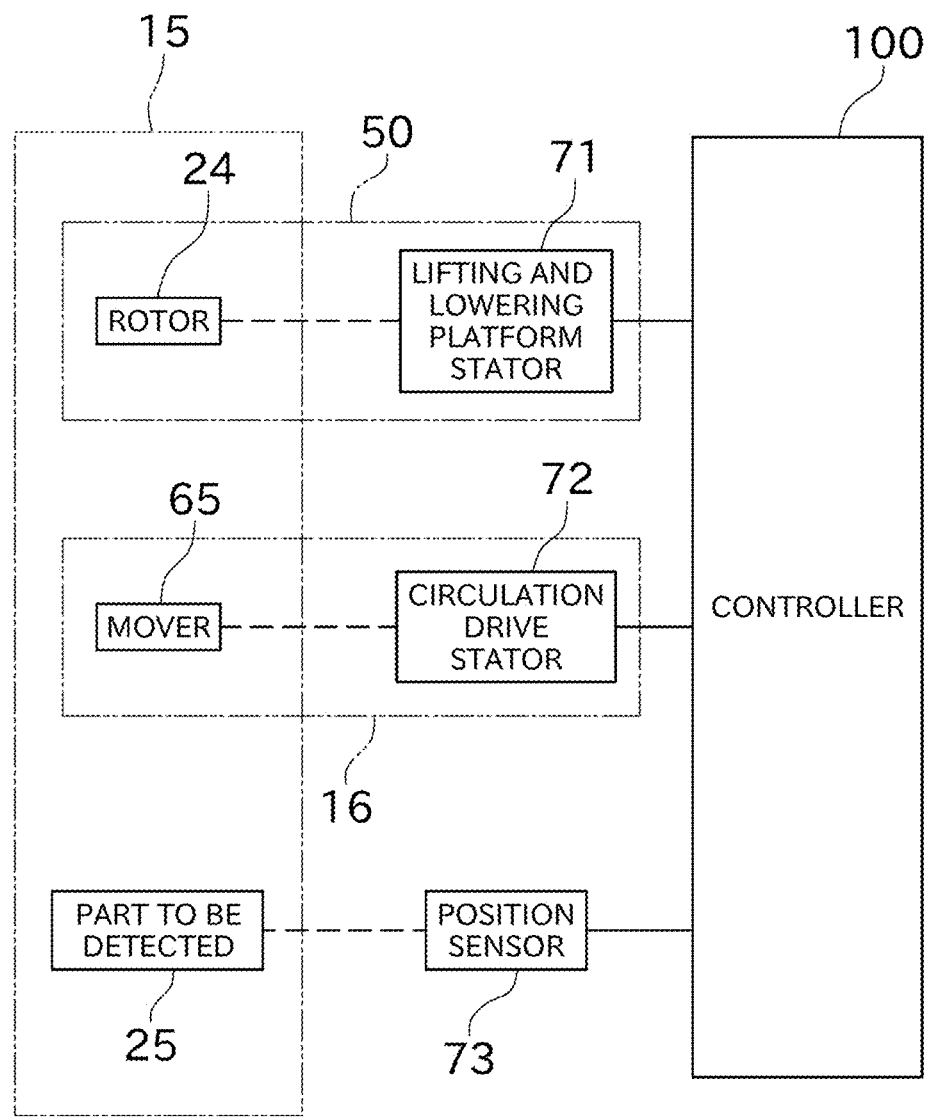
FIG. 4 is a block diagram showing the functional configuration of the lifting and lowering transportation device.

Next, referring to FIG. 4, the control of the lifting and lowering transportation device 1 will be described. FIG. 4 is a block diagram showing the functional configuration of the lifting and lowering transportation device 1.

The lifting and lowering transportation device 1 is further provided with a controller 100. The controller 100 can control each transportation unit 11 independently from other transportation units 11.

The controller 100 is, for example, a known computer including a CPU, ROM, RAM, and the like. Various programs, etc. are stored in the ROM. The CPU can read the various programs, etc. from the ROM and execute them.

The controller 100 is operatively or physically connected to the lifting and lowering platform stator 71, the circulation drive stator 72, and the position sensor 73.

The magnetism of the circulation drive stator 72 is applied to the mover 65 that is in the facing position to the circulation drive stator 72, while the magnetism of the circulation drive stator 72 is not applied to the mover 65 that is not in the facing position to the circulation drive stator 72. In other words, the circulation drive stator 72 that can apply magnetism to the mover 65 differs depending on the position of the mover 65. With respect to the mover 65 in each of the transportation units 11, the controller 100 controls each circulation drive stator 72 independently so that the circulation drive stator 72 facing the mover 65 acts magnetism.

The above makes it possible to move/stop and change the speed of movement of each transportation unit 11 (lifting and lowering platform 15) without interlocking it with other transportation units 11 (lifting and lowering platforms 15). In other words, the plurality of lifting and lowering platforms 15 can be raised and lowered at individual speeds.

For example, the following control is possible. As a general rule, the six lifting and lowering platforms 15 move in one direction at an appropriate set speed, maintaining an equal distance from each other. In this situation, for example, consider the case where a given lifting and lowering platform 15 decelerates or stops at any of the delivery positions for loading of the article 3. Even in this case, the other lifting and lowering platforms 15 can continue to move toward any of the delivery positions for transporting or loading the articles 3 without decelerating, etc., within the extent where they do not interfere with the predetermined lifting and lowering platforms 15. The lifting and lowering platform 15, which has been decelerated or stopped for the loading of the article 3, moves at a slightly higher speed than the above set speed for a while after the loading is completed. This eliminates the delay to the preceding lifting and lowering platform 15.

Thus, in this preferred embodiment, the deceleration or stopping of one lifting and lowering platform 15 is less likely to affect the transportation on the other lifting and lowering platforms 15. Therefore, the overall transportation efficiency can be improved because transportation can be performed while maintaining flexibility in the timing of delivery of the article 3 on each of the lifting and lowering platforms 15.

As described above, the position sensor 73 is preferably a magnetic sensor and can detect the portion to be detected 25 of the lifting and lowering platform 15 without contacting it. However, the position sensor 73 is not limited to the above, and can also be an optical sensor, for example.

When the controller 100 detects that the lifting and lowering platform 15 has reached the target delivery position based on the detection results of the position sensor 73, the controller 100 controls the lifting and lowering platform stator 71 so that the lifting and lowering platform stator 71 acts magnetically on the rotor 24 of the lifting and lowering platform 15. As a result, the transport device 22 is driven, and the article 3 can be loaded or unloaded on the lifting and lowering platform 15.

In this preferred embodiment, the lifting and lowering platform stator 71 of the motor 50 and the circulation drive stator 72 of the linear motor 16 are all fixedly installed on the ground side (in the building). In other words, they are fixed in position so that they do not move in conjunction with the movement of the lifting and lowering platform 15. Therefore, even if the lifting and lowering platform 15 moves, the electric wires to apply electric current to the coils of the lifting and lowering platform stator 71 and the circulation drive stator 72 do not become entangled or break. As a result, simplification of the configuration can be achieved.

As described above, the lifting and lowering transportation device 1 of the present preferred embodiment can transport the articles 3 between the plurality of delivery positions. The lifting and lowering transportation device 1 includes a plurality of transportation units 11 and a controller 100. The controller 100 is configured or programmed to control the transportation units 11. Each of transportation units 11 includes the lifting and lowering platform 15, the linear motor 16, and the chain 17. The lifting and lowering platform 15 can pass through the plurality of the delivery positions by moving along the circumferential track 20 which includes a vertical track extending in the vertical direction. The circumferential track 20 is common to a plurality of transportation units 11. The linear motor 16 generates a driving force to move the lifting and lowering platform 15 along the circumferential track 20. The chain 17 is loop-shaped and can travel along the circulation track corresponding to the circumferential track 20. The chain travels by the driving force generated by the linear motor 16 to move the lifting and lowering platform 15. The controller 100 controls the traveling of the chain 17 in each of the transportation units 11 independently with respect to other transportation units 11.

This allows the lifting and lowering platform 15 of each transportation unit 11 to be moved along the circumferential track 20 independently with respect to the lifting and lowering platform 15 of the other transportation units 11. Therefore, the articles 3 can be transported while increasing or decreasing the distance between adjacent lifting and lowering platforms 15 in the movement direction as appropriate to the extent that mechanical interference does not occur. Therefore, the transportation efficiency of the articles 3 can be effectively improved.

In addition, even when other lifting and lowering platforms 15 are moving, since the lifting and lowering platform 15 can be stopped at the delivery position and the article 3 can be delivered, the articles 3 can be delivered in a stable manner.

In the lifting and lowering transportation device 1 of this preferred embodiment, the lifting and lowering platform 15 included in each of transportation units 11 includes the rotor 24, and the transport device 22. The rotor 24 can rotate around an axis in the vertical direction. The transport device 22 is driven by the rotation of the rotor 24 to transport the article 3 for delivery. The lifting and lowering platform stators 71 are provided corresponding to the plurality of delivery positions. The lifting and lowering platform stator 71 has a hollow shape. The inner space 81 of the lifting and lowering platform stator 71 is open to the outside at both ends in the vertical direction of the lifting and lowering platform stator 71. The lifting and lowering platform stator 71 includes the opening 82 that opens the inner space 81 to the outside in the horizontal direction. The opening 82 connects the open portions at both ends in the vertical direction. When the lifting and lowering platform 15 is at any of the delivery positions, the lifting and lowering platform stator 71 at the delivery position is positioned so that it is not in contact with the rotor 24 in the lifting and lowering platform 15 and is positioned so as to surround the rotor 24. The lifting and lowering platform stator 71 drives the rotor 24 in a non-contact manner by generating a magnetic effect while surrounding the rotor 24.

As a result, in relation to the motor 50 which is made of the rotor 24 and the lifting and lowering platform stator 71, the transport device 22 can be driven by supplying electric power to the lifting and lowering platform stator 71 on the ground side without installing electric wires in the lifting and lowering platform 15 or the like which is a movable member.

In the lifting and lowering transportation device 1 of this preferred embodiment, the linear motor 16 generates a driving force to move the lifting and lowering platform 15 along the circumferential track 20. The linear motor 16 has the mover 65 connected to the chain 17, and the circulation drive stator 72 provided on the fixed side.

As a result, by supplying electric power to the circulation drive stator 72 on the ground side (fixed side) without installing electric wires to the chain 17, etc. which is the movable member, the linear motor 16 can generate a driving force to the mover 65 to move the lifting and lowering platform 15.

In the lifting and lowering transportation device 1 of this preferred embodiment, the circulation drive stator 72 is common to a plurality of the transportation units 11.

This allows the number of parts to be reduced.

In the lifting and lowering transportation device 1 of this preferred embodiment, the mover 65 and the lifting and lowering platform 15 positioned with respect to the chain 17 at positions that divide the chain 17 in a loop shape into two portions of equal length.

This allows the mover 65 to function as a counterweight to the lifting and lowering platform 15, no matter where the lifting and lowering platform 15 is positioned in the circumferential track 20. Therefore, the weight of a separate counterweight can be reduced or the counterweight can be omitted.

In the lifting and lowering transportation device 1 of the present preferred embodiment, the mover 65 has a U-shaped cross section. The circulation drive stator 72 can pass relatively through the inner space surrounded by the mover 65.

This allows a powerful linear motor 16 to be realized.

In the lifting and lowering transportation device 1 of this preferred embodiment, the circulation drive stators 72 are provided in an arranged manner along the circulation track of the chain 17. In the traveling direction of the mover 65, the distance S1 between adjacent circulation drive stators 72 is shorter than the length L1 of the mover 65 (S1<L1).

As a result, it is possible to keep a state in which any of the circulation drive stators 72 can apply magnetism to the mover 65, regardless of the position of the mover 65. Therefore, a stable drive by the linear motor 16 can be realized.

In the lifting and lowering transportation device 1 of this preferred embodiment, the lifting and lowering platform 15 is supported by the chain 17 in a cantilevered manner.

This allows a simple configuration of the transportation unit 11 to be realized.

The lifting and lowering transportation device 1 is used to transport articles between different floors in the factory having a plurality of floors.

This can achieve efficient transport between floors.

Figure 5:
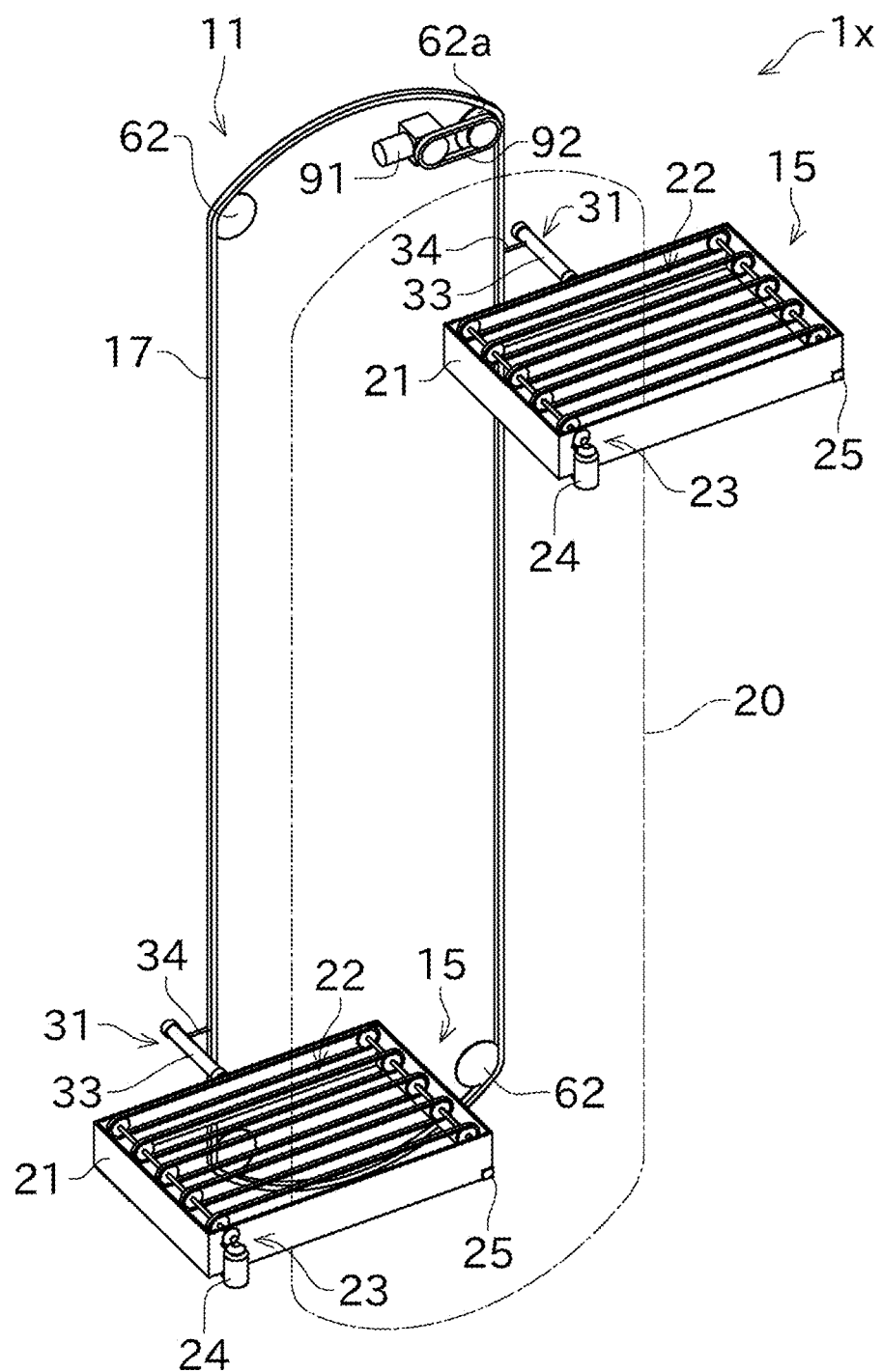
FIG. 5 is a perspective view showing one transportation unit in a variant of the lifting and lowering transportation device.

Next, a modification of the above preferred embodiments will be described. FIG. 5 is a perspective view showing only one transportation unit 11 in a lifting and lowering transportation device 1x according to this modification. In the description of this modification, members identical or similar to those of the above-described preferred embodiments are given the same reference numerals on the drawing, and descriptions thereof may be omitted.

In the lifting and lowering transportation device 1x of this modification, the chain 17 is not driven by the linear motor 16, but by a rotary motor that generates a rotational force. In the lifting and lowering transportation device 1x of this modification, the mover 65 and the circulation drive stator 72 are not provided.

One of the four sprockets 62 guiding the chain 17 is a drive sprocket 62a (drive rotation member). The rotational force generated by a rotary motor 91 is transmitted via a transmission chain 92 to the drive sprocket 62a to drive the drive sprocket 62a.

In this modification, two lifting and lowering platforms 15 are provided for each transportation unit 11. The two lifting and lowering platforms 15 are positioned to divide the chain 17 in a loop shape into two portions of equal length. This allows one of the lifting and lowering platforms 15 to function as a counterweight to the other lifting and lowering platform 15.

Although only one transportation unit 11 is shown in FIG. 5, the lifting and lowering transportation device 1x of this modification preferably includes three transportation units 11. The three chains 17 are arranged in a row while being separated by a small distance between them. For each transportation unit 11 (in other words, the chain 17), the rotary motor 91 is located. Therefore, each transportation unit can be controlled independently. In order to secure space for a plurality of rotary motors 91, it is preferable to make the position of the drive sprocket 62a of the chain 17 different between the four sprockets 62 for each transportation unit 11.

In this modification, the six lifting and lowering platforms 15 are driven by three chains 17. Considering two lifting and lowering platforms 15 attached to the same chain 17 as a pair, when one of two lifting and lowering platforms 15 moves/stops, the other of the same pair also moves/stops. However, the lifting and lowering platforms 15 belonging to different pairs can move/stop independently of each other.

As explained above, in the lifting and lowering transportation device 1x of this modification, the rotary motor 91 generates a driving force to move the lifting and lowering platform 15 along the circumferential track 20. The rotational force generated by the rotary motor 91 rotates the drive sprocket 62a to drive the chain 17.

This allows the chain 17 to be driven with a simple configuration.

In the lifting and lowering transportation device 1x of this modification, the chain 17 travels along a circulation track corresponding to the circumferential track 20. The rotary motor 91 is an electric motor. The drive sprocket 62a meshes with the chain 17.

This allows for a simplified configuration.

In the lifting and lowering transportation device 1x of this modification, two lifting and lowering platforms 15 are attached to the chain 17. The two lifting and lowering platforms 15 are positioned with respect to the chain 17 at positions that divide the chain 17 in a loop shape into two portions of equal length.

This allows one of the lifting and lowering platforms 15 to function as a counterweight to the other lifting and lowering platform 15, regardless of where the lifting and lowering platforms 15 are positioned.

Although the preferred embodiment and the modifications of the present invention have been described above, the configurations described above may be modified as follows, for example.

The lifting and lowering transportation device 1 may be used in a building other than a factory, for example a warehouse. The lifting and lowering transportation device 1 may be used for other purposes than inter-floor transport device. For example, the lifting and lowering transportation device 1 can be used to transport articles between different tiers in a rack having a plurality of tiers. In such a rack, the transportation of the articles in the same tier may be performed by a cart that can move back and forth in the horizontal direction.

In the above preferred embodiments, the mover 65 is preferably U-shaped so as to sandwich the circulation drive stator 72. However, the shape of the mover 65 can be arbitrary. For example, the mover 65 may be plate-shaped facing the circulation drive stator 72.

In the above preferred embodiments, the circulation drive stator 72 is common for the linear motors 16 of the plurality of transportation units 11. However, a circulation drive stator 72 may be provided for each of the transportation units 11. In this case, in each of the transportation units 11, the movers 65 travel on separate tracks from each other.

In the above-mentioned preferred embodiments using linear motors 16, two lifting and lowering platform 15 and two movers 65 may be provided for each transportation unit 11.

In the modification of FIG. 5, one of the two lifting and lowering platforms 15 may be omitted.

The article 3 to be transported is optional, but may be, for example, a case, FOUP, etc.

Each transportation unit 11 may be provided with a fall prevention mechanism to prevent the lifting and lowering platform 15 (the article 3) from falling. For example, a conventionally known fall prevention mechanism may be used.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A lifting and lowering transportation device capable of transporting articles between a plurality of delivery positions, the lifting and lowering transportation device comprising:
   a plurality of transportation units; and
   a controller configured or programmed to control the transportation units; wherein
   each of the transportation units includes:
      a lifting and lowering platform that can pass through the plurality of the delivery positions by moving along a circumferential track including a vertical track extending in a vertical direction, the circumferential track being common to the plurality of transportation units;

a driver to generate a driving force to move the lifting and lowering platform along the circumferential track; and a circulator which is loop-shaped to circulate along a circulation track corresponding to the circumferential track by the driving force generated by the driver to move the lifting and lowering platform; and the controller is configured or programmed to control circulation of the circulator in each of the transportation units independently with respect to the other transportation units such that a distance between adjacent lifting and lowering platforms in a movement direction is changeable.

2. The lifting and lowering transportation device according to claim 1, wherein the lifting and lowering platform included in each of the transportation units includes:

a rotor rotatable around an axis in a vertical direction; and a transporter driven by the rotation of the rotor to transport the article for delivery;

lifting and lowering platform stators are provided corresponding to the plurality of delivery positions;

each of the lifting and lowering platform stators has a hollow shape;

an inner space of each of the lifting and lowering platform stators is open to outside at both ends of a vertical direction of the lifting and lowering platform stators;

each of the lifting and lowering platform stators includes an opening that opens the inner space to the outside in a horizontal direction, connecting open portions at both ends in the vertical direction;

when the lifting and lowering platform is at any of the plurality of delivery positions, the lifting and lowering platform stator at the delivery position is positioned so that the lifting and lowering platform stator is not in contact with and surrounds the rotor in the lifting and lowering platform; and the lifting and lowering platform stator drives the rotor in a non-contact manner by generating a magnetic effect while surrounding the rotor.

3. The lifting and lowering transportation device according to claim 1, wherein the driver includes a linear motor including a mover connected to the circulator and a circulation drive stator provided on the fixed side.

4. The lifting and lowering transportation device according to claim 1, wherein the circulation drive stator is common to the plurality of transportation units.

5. The lifting and lowering transportation device according to claim 3, wherein the mover and the lifting and lowering platform are positioned with respect to the circulator at positions that divide the circulator in a loop shape into two portions of equal length.

6. The lifting and lowering transportation device according to claim 1, wherein the driver includes a rotary motor; and the circulator is driven by rotation of a drive rotor by the rotational force generated by the rotary motor.

7. The lifting and lowering transportation device according to claim 6, wherein the circulator includes a chain;

the rotary motor is an electric motor; and the drive rotor includes a sprocket that meshes with the chain.

8. The lifting and lowering transportation device according to claim 6, wherein two of the lifting and lowering platforms are attached to the circulator; and the two lifting and lowering platforms are positioned with respect to the circulator at positions that divide the circulator in a loop shape into two portions of equal length.

9. The lifting and lowering transportation device according to claim 3, wherein the mover includes a U-shaped cross section; and the circulation drive stator is capable of passing through the inner space surrounded by the mover.

10. The lifting and lowering transportation device according to claim 3, wherein the circulation drive stators are provided along the circulation track of the circulator; and in a traveling direction of the mover, a distance between adjacent circulation drive stators is shorter than a length of the mover.

11. The lifting and lowering transportation device according to claim 1, wherein the lifting and lowering platform is supported by the circulator in a cantilevered manner.

12. The lifting and lowering transportation device according to claim 1, wherein the lifting and lowering transportation device is configured to transport articles between different floors in a building having a plurality of floors.

13. The lifting and lowering transportation device according to claim 1, wherein the lifting and lowering transportation device is configured to transport articles between different tiers in a rack including a plurality of tiers.

* * * * *